(12) United States Patent
Sha et al.

(10) Patent No.: US 11,991,752 B2
(45) Date of Patent: May 21, 2024

(54) SYSTEM AND METHOD FOR PERFORMING A RANDOM ACCESS PROCEDURE

(71) Applicant: ZTE Corporation, Guangdong (CN)

(72) Inventors: Xiubin Sha, Shenzhen (CN); Bo Dai, Shenzhen (CN); Ting Lu, Shenzhen (CN); Xu Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/838,787

(22) Filed: Jun. 13, 2022

(65) Prior Publication Data
US 2022/0312496 A1 Sep. 29, 2022

Related U.S. Application Data

(63) Continuation of application No. 16/927,255, filed on Jul. 13, 2020, now Pat. No. 11,363,640, which is a continuation of application No. PCT/CN2018/072791, filed on Jan. 16, 2018.

(51) Int. Cl.
H04W 74/08 (2009.01)
H04W 48/10 (2009.01)
H04W 72/51 (2023.01)
H04W 74/0833 (2024.01)

(52) U.S. Cl.
CPC ....... H04W 74/0833 (2013.01); H04W 48/10 (2013.01); H04W 72/51 (2023.01)

(58) Field of Classification Search
None
See application file for complete search history.

(56) References Cited

U.S. PATENT DOCUMENTS 10,917,825 B2 * 2/2021 Peisa .............. H04W 36/06
2011/0170503 A1 * 7/2011 Chun .............. H04W 74/006
370/329

(Continued)

FOREIGN PATENT DOCUMENTS

CN 102474884 A 5/2012
CN 104704884 A 6/2015

(Continued)

OTHER PUBLICATIONS

Australian Search Report for AU Appl. No. 2018402576 dated Jan. 18, 2021 (5 pages).

(Continued)

Primary Examiner — Hong S Cho
(74) Attorney, Agent, or Firm — Foley & Lardner LLP

(57) ABSTRACT

A system and method for allocating network resources are disclosed herein. In one embodiment, the system and method are configured to perform: broadcasting at least one message indicating first and second formats. The first format is used by a plurality of wireless communication devices to send respective first random access preambles and the second format is used by the plurality of wireless communication devices to send respective second random access preambles. The first and second formats respectively correspond to first and second cell coverage ranges of a wireless communication node, wherein the second cell coverage range is greater than the first cell coverage range.

16 Claims, 5 Drawing Sheets

(56) References Cited

U.S. PATENT DOCUMENTS

| | | | | |
|---|---|---|---|---|
| 2015/0319779 A1* | 11/2015 | Li | ............... | H04W 74/002 370/329 |
| 2015/0365978 A1* | 12/2015 | Kim | ............... | H04W 74/006 370/329 |
| 2017/0111908 A1* | 4/2017 | Xiong | ............... | H04W 74/0833 |
| 2018/0235013 A1* | 8/2018 | Jung | ............... | H04W 74/006 |
| 2018/0242367 A1* | 8/2018 | Kim | ............... | H04L 5/0053 |

FOREIGN PATENT DOCUMENTS

| | | | |
|---|---|---|---|
| CN | 107295692 | A | 10/2017 |
| CN | 107432042 | A | 12/2017 |
| EP | 3 185 615 | A1 | 6/2017 |
| KR | 20150023943 | A | 3/2015 |
| KR | 20150064196 | A | 2/2020 |
| WO | WO-2010/016726 | A2 | 2/2010 |
| WO | WO-2011/017281 | A1 | 2/2011 |
| WO | WO-2015/041487 | A1 | 3/2015 |
| WO | WO-2017/118177 | A1 | 7/2017 |
| WO | WO-2017/212443 | A1 | 12/2017 |
| WO | WO-2018060543 | A1 * | 4/2018 |

OTHER PUBLICATIONS

Ericsson: "NR PRACH design", 3GPP Draft; R1-1700298_NR_PRACH_Design, 3rd Generation Partnership Project (3GPP), Mobile Competence Centre ; 650, Route Des Lucioles ; F-06921 Sophia-Antipolis Cedex ; France, vol. RAN WG1, No. Spokane, USA; Jan. 16, 2017-Jan. 20, 2017 Jan. 16, 2017 (Jan. 16, 2017),(22 Pages) XP051207836, Retrieved from the Internet: URL:http://www.3gpp.org/ftp/Meetings_3GPP_SYNC/RAN1/Docs/ [retrieved on Jan. 16, 2017].

Extended European Search Report for EP Appl. No. 18901133.1 , dated Nov. 27, 2020. (14 Pages).

First Office Action for CN Appl. No. 201880086588.3, dated Dec. 15, 2021 (with English translation, 17 pages).

First Office Action for KR Appl. No. 10-2020-7022840, dated Jun. 17, 2021 (with English translation, 14 pages).

International Search Report and Written Opinion for PCT App. No. PCT/CN2018/072791 dated Oct. 11, 2018 (6 Pages).

NTT Docomo et al: "Discussion on remaining details on PRACH preamble formats for long/short sequence length", 3GPP Draft; R1-1713902_Discussion on Remaining Details on PRACH Preamble Formats for Long and Short Sequence Length_Final, 3rd Generation Partnership Project (3GPP), Mobile Competence Centre; 650, RO, vol. RAN WG 1, No. Prague, Czech Republic; Aug. 21, 2017-Aug. 25, 2017 Aug. 20, 2017 (Aug. 20, 2017),(14 Pages) XP051316694, Retrieved from the Internet: URL:http://www.3gpp.org/ftp/Meetings_3GPP.

U.S. Notice of Allowance on U.S. Appl. No. 16/927,255 dated Feb. 7, 2022.

U.S. Office Action on U.S. Appl. No. 16/927,255 dated Oct. 25, 2021.

* cited by examiner

SYSTEM AND METHOD FOR PERFORMING A RANDOM ACCESS PROCEDURE

CROSS REFERENCE TO RELATED APPLICATION

This application claims the benefit of priority under 35 U.S.C. § 120 as a continuation of U.S. Non-Provisional patent application Ser. No. 16/927,255, filed on Jul. 13, 2020, which is a continuation of PCT Patent Application No. PCT/CN2018/072791, filed on Jan. 16, 2018, the disclosure of which is incorporated herein by reference in its entirety.

TECHNICAL FIELD

The disclosure relates generally to wireless communications and, more particularly, to systems and methods for using a random access channel.

BACKGROUND

In accordance with rapid developments and increasing needs of the Internet of Things (IoT), a new radio interface, a Narrowband Internet of Things (NB-IoT), has been proposed by the 3$^{rd}$ Generation Partnership Project (3GPP). The NB-IoT is aimed to enhance existing Global System for Mobile Communications (GSM) and Long-Term Evolution (LTE) networks to better serve IoT uses or applications. Improved indoor coverage, support for massive number of low throughput end devices, low delay sensitivity, ultra-low device cost, coverage extension, battery lifetime extension, and backward compatibility are some exemplary objectives of the NB-IoT.

Generally, in a wireless communication system adopting the NB-IoT (hereinafter "NB-IoT system"), a user equipment device (UE) sends at least one preamble signal (hereinafter "Preamble"), typically via a Physical Random Access Channel (PRACH), to a base station (BS) to initiate a contention-based random access procedure. Such a Preamble is used as a temporary identity of the UE for the BS to estimate various information, e.g., Timing Advance (TA) command, scheduling of uplink resources for the UE to use in subsequent steps, etc., such that the UE may use the above-mentioned information to finish the random access procedure.

However, it has been noted that using legacy formats of the Preamble may encounter a variety of issues such as, for example, wrong estimation of the TA command when a respective coverage of the BS extends beyond 100 kilometers in radius (typically known as a "cell"), strong interference among plural neighboring cells, etc. Although some different Preamble formats (hereinafter "non-legacy Preamble formats") have been proposed to resolve at least some of the aforementioned issues, in the existing NB-IoT system, the UE's cannot differentiate the legacy Preamble formats and aforementioned "non-legacy" Preamble formats, which may disadvantageously limit various potential applications of the NB-IoT system. Accordingly, the existing NB-IoT system is not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a wireless communication node includes: broadcasting at least one message indicating first and second formats. The first format is used by a plurality of wireless communication devices to send respective first random access preambles and the second format is used by the plurality of wireless communication devices to send respective second random access preambles. The first and second formats respectively correspond to first and second cell coverage ranges of the wireless communication node, the second cell coverage range being greater than the first cell coverage range.

In a further embodiment, a method performed by a wireless communication device includes: receiving, from a wireless communication node, at least one broadcasted message indicating first and second formats. The first format is used by the wireless communication device to send a respective first random access preamble to the wireless communication node and the second format is used by the wireless communication device to send a respective second random access preamble wireless communication node. The first and second formats respectively correspond to first and second cell coverage ranges of the wireless communication node, the second cell coverage range being greater than the first cell coverage range.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
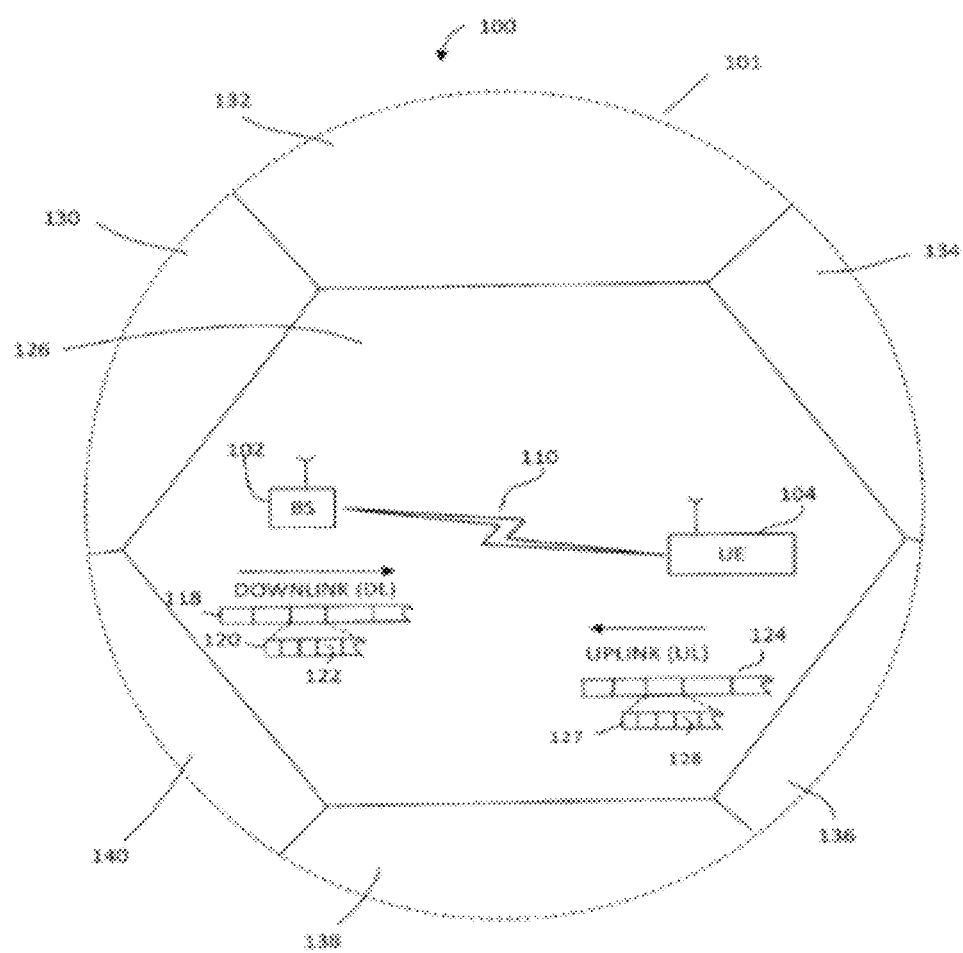
FIG. 1 illustrates an exemplary cellular communication network in which techniques disclosed herein may be implemented, in accordance with an embodiment of the present disclosure.

FIG. 1 illustrates an exemplary wireless communication network, or system, 100 in which techniques disclosed herein may be implemented, in accordance with an embodiment of the present disclosure. In the following discussion, the wireless communication network 100 may be a NB-IoT network, which is herein referred to as "network 100." Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
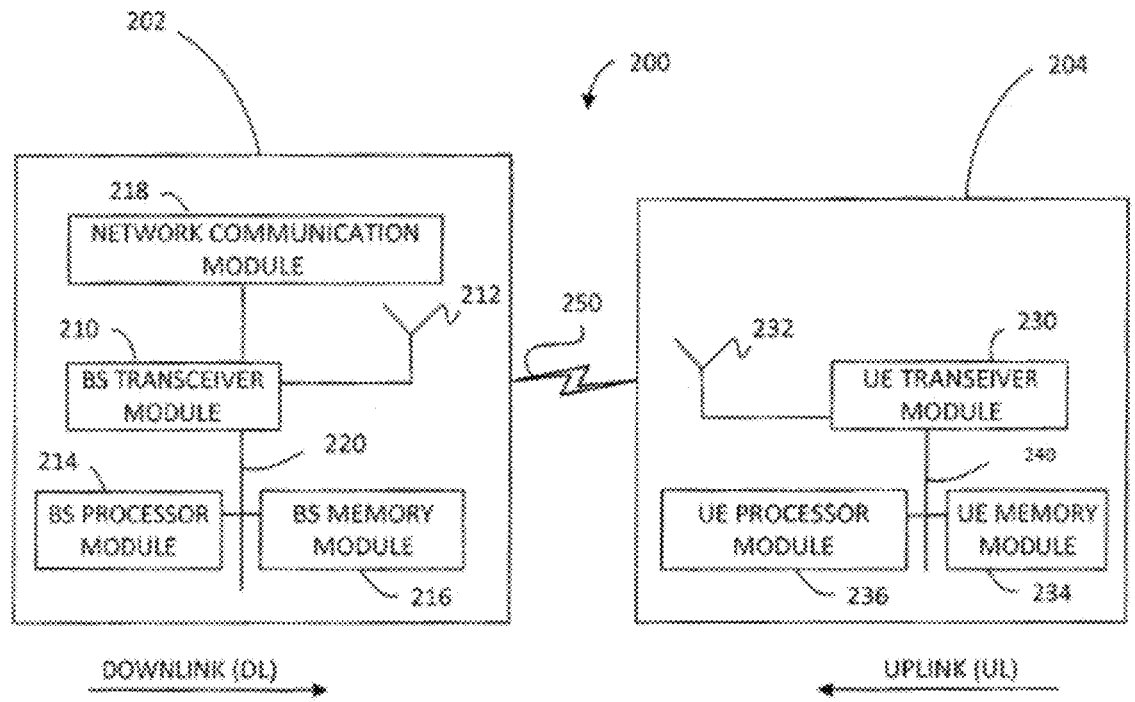
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

As discussed above, in the existing NB-IoT system, even though a non-legacy Preamble format intending for the UE to access into a cell that extends beyond 40 kilometers (km) in radius of the coverage range (e.g., a cell with a coverage range of about 100 km in radius) may be provided, some UE's in the existing NB-IoT system still cannot efficiently use such a non-legacy Preamble format. The present disclosure provides various embodiments of an NB-IoT system (e.g., BS 102 and UE 104, BS 202 and UE 204) in which the UE 104 sends a Preamble using a format, previously allocated by the BS 102, to the BS 102 for initiating a random access procedure. In some embodiments, the format, which includes legacy and non-legacy Preamble formats, can be allocated by the BS 102 through broadcasting one or more messages.

According to various embodiments of the present disclosure, when compared to the legacy Preamble format, the non-legacy Preamble format may include at least one of the following characteristics: a longer time duration of a cyclic prefix (CP), which is typically referred to as a longer CP length; using a different hopping pattern; using a different random access channel interference method; using a different symbol for the CP; a narrower sub-carrier spacing; and a larger repetition number for performing random access procedure(s). In an example, the legacy Preamble format is intended to be used by the UE for random accessing a cell with a coverage range up to 40 km in radius; and the non-legacy Preamble format is intended to be used by the UE for random accessing a cell with a coverage range up to 100 km in radius. Further, in some embodiments, the BS 102 allocates the non-legacy Preamble formats based on various factors, or parameters, related to the UE's in the system, which will be discussed in further detail below. As such, after receiving such one or more broadcasted messages, the UE's (e.g., UE 104) can efficiently choose proper Preamble formats, and corresponding communication resources, based on those factors/parameters.

Figure 3:
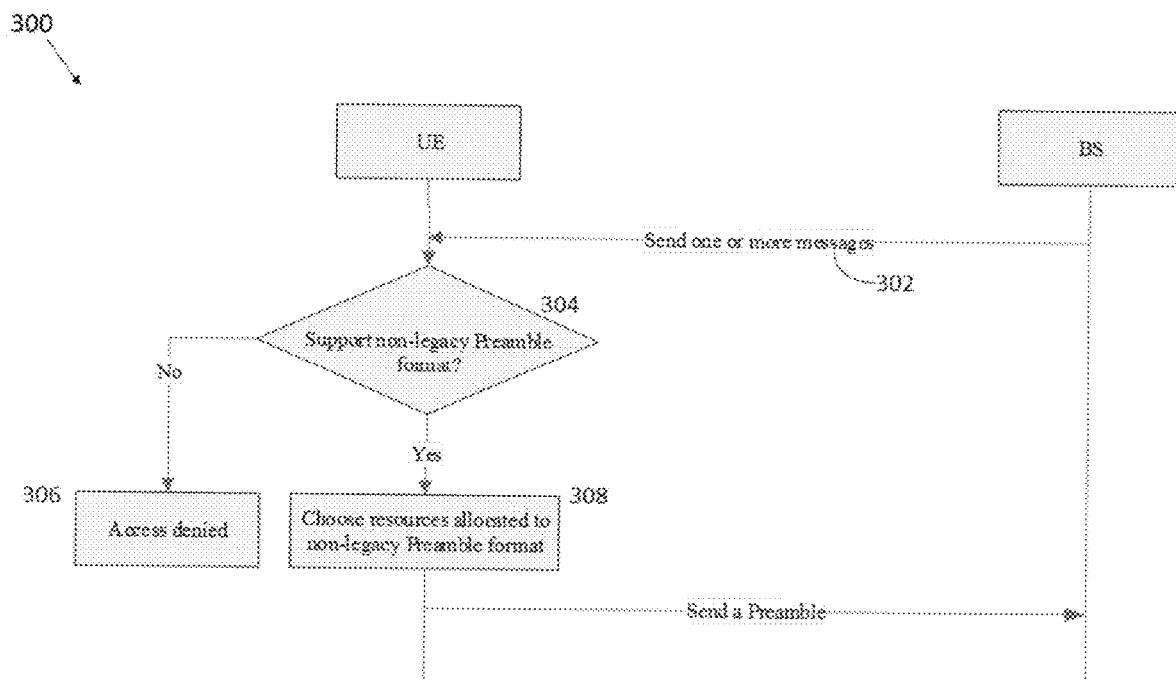
FIG. 3 illustrates a flow chart of an exemplary method collectively performed by a base station and user equipment device to initiate a random access procedure, in accordance with some embodiments of the present disclosure.

FIG. 3 illustrates an exemplary method 300 collectively performed by a BS and a UE in the disclosed NB-IoT system to initiate a random access procedure, in accordance with some embodiments of the present disclosure. In various embodiments, the operations of the method 300 are performed by the respective components illustrated in FIGS. 1-2. For purposes of discussion, the following embodiment of the method 300 will be described in conjunction with FIGS. 1-2. The illustrated embodiment of the method 300 is merely an example. Therefore, it should be understood that any of a variety of operations may be omitted, re-sequenced, and/or added while remaining within the scope of the present disclosure.

In some embodiments, the method 300 starts with operation 302 in which the BS 102 sends one or more messages to the UE 104. According to some embodiments, the BS 102 is configured to broadcast the one or more messages, which include one or more various System Information Blocks (e.g., a System Information Block Type 1 (SIB1), a System Information Block Type 2 (SIB2), a System Information Block Type 5 (SIB5), a System Information Block Type 22 (SIB22), etc.), across a cell defined by the BS 102. Specifically, the SIB(s) broadcasted by the BS 102 include respective information of resources allocated to one or more legacy Preamble formats and resources allocated to one or more non-legacy Preamble formats, wherein such information includes how the resources, respectively allocated for the legacy Preamble format and non-legacy Preamble format, are configured and/or how each of the legacy and non-legacy Preamble formats is configured. For example, the SIB(s) broadcasted by the BS 102 may indicate: respective lists of carriers/sub-carriers configured for the legacy and non-legacy Preamble formats, respective sub-carrier spacings (SCS's) configured for the legacy and non-legacy Preamble formats, respective CP lengths configured for the legacy and non-legacy Preamble formats, and respective allocation parameters configured for the legacy and non-legacy Preamble formats (e.g., nprach-Periodicity, nprach-StartTime, nprach-SubcarrierOffset, nprach-NumSubcarriers, nprach-SubcarrierMSG3-RangeStart, npdcch-NumRepetitions-RA, npdcch-StartSF-CSS-RA, npdcch-Offset-RA, nprach-NumCBRA-StartSubcarriers, npdcch-CarrierIndex, etc.).

Further, in the embodiment with respect to FIG. 3, the SIB(s) (e.g., a System Information Block Type 1 (SIB1), a System Information Block Type 5 (SIB5)) broadcasted by the BS 102 may further indicate information about various cell-related parameters, e.g., cellBarred (a parameter defining whether the access to the cell is barred (e.g., denied)) when the legacy Preamble format is used, cellBarred ExtendedCP (a parameter defining whether the access to the cell is barred (e.g., denied)) when the non-legacy Preamble format is used, $Q_{RxLevMin}$ (a parameter defining a required minimum received Reference Signals Received Power (RSRP) level in the cell) when the legacy Preamble format is used, $Q_{RxLevMin}$_ExtendedCP (a parameter defining a required minimum received Reference Signals Received Power (RSRP) level in the cell) when the non-legacy Preamble format is used, $Q_{QualMin}$ (a parameter defining a required minimum quality level in the cell) when the legacy Preamble format is used, $Q_{QualMin}$_ExtendedCP (a parameter defining a required minimum quality level in the cell) when the non-legacy Preamble format is used, etc. For example, the BS 102 may indicate in the SIB1 that the cellBarred is set to be "barred" for certain types of UE (e.g., the UE that can only support the legacy Preamble format), and/or the BS 102 may indicate in the SIB1, SIB3, and/or SIB5 that the $Q_{RxLevMin}$ and/or $Q_{Qualmin}$ is set to be relatively high, etc. As such, when the UE 104 can only use the legacy Preamble format, such UE 104 cannot access (e.g., camp on) the cell, which will be discussed in further detail below.

After the UE 104 receives the one or more broadcasted messages, the method 300 continues to operation 304 in which the UE 104 determines whether it supports the non-legacy Preamble format. In some embodiments, the UE 104 may make the determination based on a pre-defined protocol, a higher-level message (e.g., a Radio Resource Control (RRC) message), and/or UE Capability (Information). In some embodiments, when the UE 104 does not support the non-legacy Preamble format, the method 300 continues to operation 306 in which the UE 104 is denied to access (camp on) the cell; and on the other hand, when the UE 104 does support the non-legacy Preamble format, the method 300 continues to operation 308 in which the UE 104 chooses corresponding resources allocated for the non-legacy Preamble format to initiate the random access procedure (e.g., using the non-legacy Preamble format to send a Preamble as shown in FIG. 3, etc.).

It is noted that the SIB(s) broadcasted by the BS 102 further indicate information about the cell-related parameters, cellBarred, $Q_{RxLevMin}$, $Q_{QualMin}$, as mentioned above. In some embodiments, in response to determining that the UE 104 cannot support the non-legacy Preamble format in operation 304, the UE 104 may decode the values of the cellBarred as "barred," such that the UE 104 cannot access the cell. Further, in some embodiments, the UE 104 that cannot support the non-legacy Preamble format may decode the cellBarred as barred regardless of loading of the cell. On the other hand, if the UE 104 can support the non-legacy Preamble format (as determined in operation 304), the UE 104 may decode the values of the cellBarred as "notBarred," or determine not to decode the cellBarred in accordance with some embodiments. Further, in some embodiments, the UE 104 may decode the values of the cellBarred ExtendedCP based on the loading of the cell to determine whether the UE 104 is allowed to access the cell. In some embodiments, after the UE 104 measures the received RSRP level in the cell and/or quality level in the cell, the UE 104 may not be allowed to access the cell since the $Q_{RxLevMin}$ and/or $Q_{Qualmin}$ is set to be relatively high and the measured RSRP level and/or quality level does not meet the minimum required level.

Figure 4:
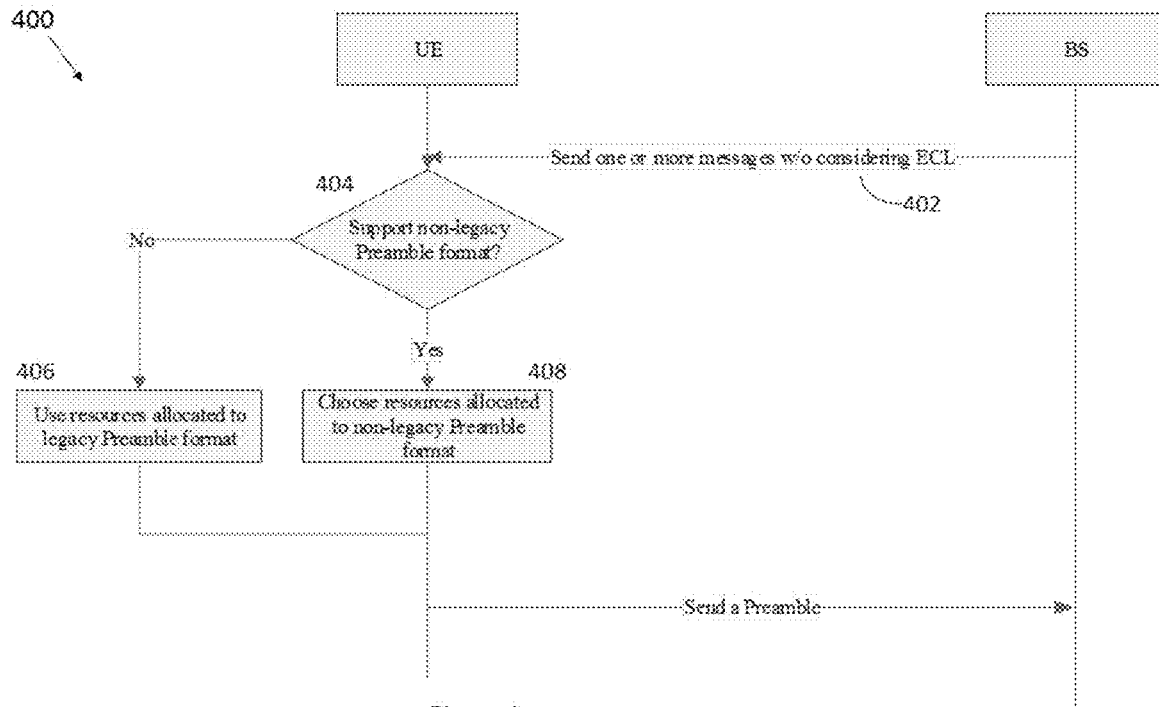
FIG. 4 illustrates a flow chart of another exemplary method collectively performed by a base station and user equipment device to initiate a random access procedure, in accordance with some embodiments of the present disclosure.

FIG. 4 illustrates an exemplary method 400 collectively performed by a BS and a UE in the disclosed NB-IoT system to initiate a random access procedure, in accordance with some embodiments of the present disclosure. In various embodiments, the operations of the method 400 are performed by the respective components illustrated in FIGS. 1-2. For purposes of discussion, the following embodiment of the method 400 will be described in conjunction with FIGS. 1-2. The illustrated embodiment of the method 400 is merely an example. Therefore, it should be understood that any of a variety of operations may be omitted, re-sequenced, and/or added while remaining within the scope of the present disclosure.

In some embodiments, the method 400 starts with operation 402 in which the BS 102 sends one or more messages to the UE 104 without considering enhanced coverage levels (ECL's). In some embodiments, the ECL, which is also referred to as a coverage enhanced level (CEL), defines an enhanced coverage level of a cell in which the UE 104 is currently located. According to some embodiments, the BS 102 is configured to broadcast the one or more messages, which include one or more various System Information Blocks (e.g., a System Information Block Type 2 (SIB2), a System Information Block Type 22 (SIB22), etc.), across a cell defined by the BS 102. Specifically, the SIB(s) broadcasted by the BS 102 include respective information of resources allocated to one or more legacy Preamble formats and resources allocated to one or more non-legacy Preamble formats, wherein such information includes how the resources, respectively allocated for the legacy Preamble format and non-legacy Preamble format, are configured and/or how each of the legacy and non-legacy Preamble formats is configured. For example, the SIB(s) broadcasted by the BS 102 may indicate: respective lists of carriers/sub-carriers configured for the legacy and non-legacy Preamble formats, respective sub-carrier spacings (SCS's) configured for the legacy and non-legacy Preamble formats, respective CP lengths configured for the legacy and non-legacy Preamble formats, and respective allocation parameters configured for the legacy and non-legacy Preamble formats (e.g., nprach-Periodicity, nprach-StartTime, nprach-Subcarrier-Offset, nprach-NumSubcarriers, nprach-SubcarrierMSG3-RangeStart, npdcch-NumRepetitions-RA, npdcch-StartSF-CSS-RA, npdcch-Offset-RA, nprach-NumCBRA-StartSubcarriers, npdcch-CarrierIndex, etc.).

Further, in the embodiment with respect to FIG. 4, the non-legacy Preamble format, broadcasted in the one or more messages by the BS 102, is independent of the UE 104's (and other UE's) ECL's. In other words, the BS 102 may only broadcast one non-legacy Preamble format and corresponding resources to the UE's in the system, in accordance with some embodiments. As such, the legacy Preamble format and the non-legacy Preamble format may be only used by respective different types of UE's, which will be discussed in further detail below.

In some embodiments, after the UE 104 receives the one or more broadcasted messages, the method 300 continues to operation 304 in which the UE 104 determines whether it supports the non-legacy Preamble format. In some embodiments, the UE 104 may make the determination based on a pre-defined protocol, a higher-level message (e.g., a Radio Resource Control (RRC) message), and/or UE Capability (Information). In some embodiments, when the UE 104 does not support the non-legacy Preamble format, the method 400 continues to operation 406 in which the UE 104, different from the method 300, can still access (camp on) the cell but chooses the corresponding resources allocated for the legacy Preamble format to initiate the random access procedure (e.g., using the non-legacy Preamble format to send a Preamble as shown in FIG. 4, etc.). On the other hand, when the UE 104 does support the non-legacy Preamble format, the method 400 continues to operation 408 in which the UE 104 chooses corresponding resources allocated for the non-legacy Preamble format to initiate the random access procedure (e.g., using the non-legacy Preamble format to send a Preamble as shown in FIG. 4, etc.).

Figure 5:
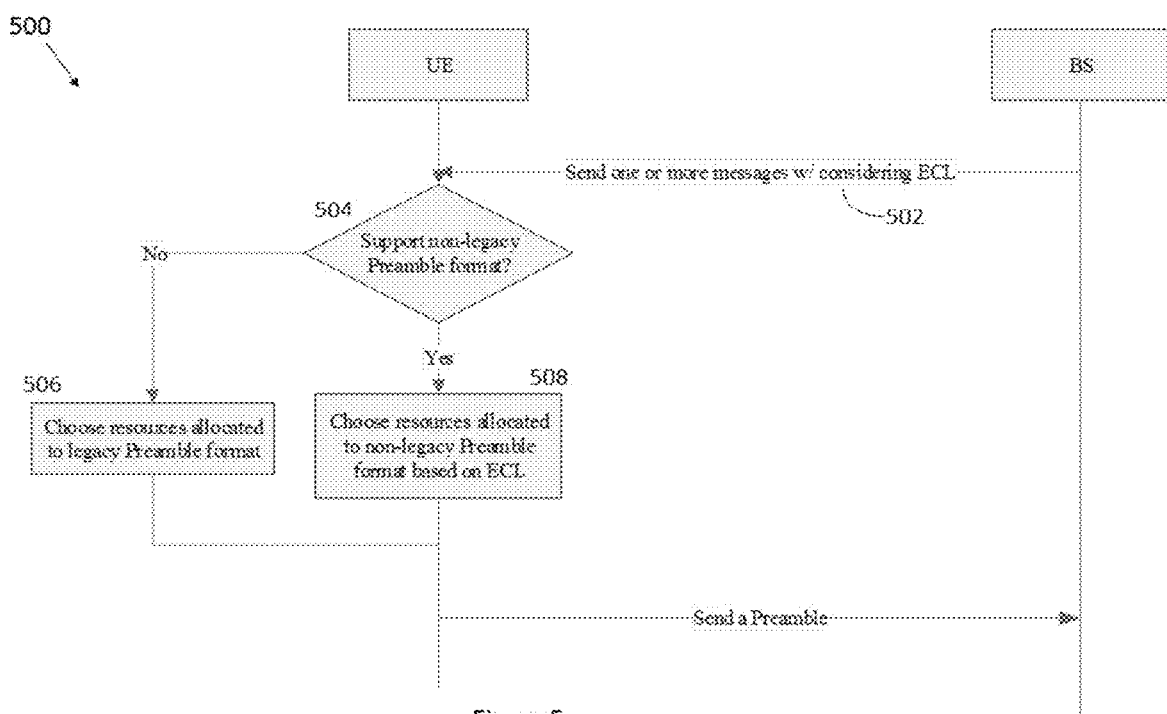
FIG. 5 illustrates a flow chart of yet another exemplary method collectively performed by a base station and user equipment device to initiate a random access procedure, in accordance with some embodiments of the present disclosure.

FIG. 5 illustrates an exemplary method 500 collectively performed by a BS and a UE in the disclosed NB-IoT system to initiate a random access procedure, in accordance with some embodiments of the present disclosure. In various embodiments, the operations of the method 500 are performed by the respective components illustrated in FIGS. 1-2. For purposes of discussion, the following embodiment of the method 500 will be described in conjunction with FIGS. 1-2. The illustrated embodiment of the method 500 is merely an example. Therefore, it should be understood that any of a variety of operations may be omitted, re-sequenced, and/or added while remaining within the scope of the present disclosure.

In some embodiments, the method 500 starts with operation 502 in which the BS 102 sends one or more messages to the UE 104 with considering enhanced coverage levels (ECL's). In some embodiments, the ECL, which is also referred to as a coverage enhanced level (CEL), defines an enhanced coverage level of a cell in which the UE 104 is currently located. According to some embodiments, the BS 102 is configured to broadcast the one or more messages, which include one or more various System Information Blocks (e.g., a System Information Block Type 2 (SIB2), a System Information Block Type 22 (SIB22), etc.), across a cell defined by the BS 102. Specifically, the SIB(s) broadcasted by the BS 102 include respective information of resources allocated to one or more legacy Preamble formats and resources allocated to one or more non-legacy Preamble formats, wherein such information includes how the resources, respectively allocated for the legacy Preamble format and non-legacy Preamble format, are configured and/or how each of the legacy and non-legacy Preamble formats is configured. For example, the SIB(s) broadcasted by the BS 102 may indicate: respective lists of carriers/sub-carriers configured for the legacy and non-legacy Preamble formats, respective sub-carrier spacings (SCS's) configured for the legacy and non-legacy Preamble formats, respective CP lengths configured for the legacy and non-legacy Preamble formats, and respective allocation parameters configured for the legacy and non-legacy Preamble formats (e.g., nprach-Periodicity, nprach-StartTime, nprach-Subcarrier-Offset, nprach-NumSubcarriers, nprach-SubcarrierMSG3-RangeStart, npdcch-NumRepetitions-RA, npdcch-StartSF-CSS-RA, npdcch-Offset-RA, nprach-NumCBRA-StartSubcarriers, npdcch-CarrierIndex, etc.).

Further, in the embodiment with respect to FIG. 5, the SIB(s) (e.g., a System Information Block Type 2 (SIB2), a System Information Block Type 22 (SIB22)) broadcasted by the BS 102 may further indicate information about the correspondence of one or more ECL's to the legacy Preamble format and/or non-legacy Preamble format, which allows the UE 104 to select a proper format for initiating the random access procedure as will be discussed below.

In an embodiment, such information indicates one or more legacy Preamble formats respectively corresponding to a first set of ECL's, and one or more non-legacy Preamble formats respectively corresponding to a second set of ECL's. Accordingly, in response to the UE 104 determining its own ECL (as will be discussed below), the UE 104 may use the determined ECL to select the corresponding Preamble format (and allocated resources) to initiate the random access procedure.

In another embodiment, such information implicitly indicates whether the legacy/non-legacy Preamble format is available to use by indicating a number of allocated sub-carriers, or carriers, corresponding to a certain ECL. When the number of sub-carriers corresponding to a certain ECL is zero, it may indicate that no resources allocated for such an ECL; and when the number of sub-carriers corresponding to a certain ECL is not zero, it may indicate that there are resources allocated for such an ECL. As such, in response to the UE 104 determining its own ECL (as will be discussed below), the UE 104 may use the determined ECL to further determine whether the corresponding Preamble format is available (i.e., a zero or non-zero number of sub-carriers) to be used for initiating the random access procedure.

In yet another embodiment, such information indicates a minimum ECL supported by one of a plurality of carriers. In some embodiments, the minimum ECL corresponds to a first Preamble format (and a corresponding set of allocated resources), a next greater ECL corresponds to a second Preamble format (and a corresponding set of allocated resources), and so on, which are broadcasted by the BS 102. For example, the first Preamble format may be a legacy Preamble format, and the second Preamble format may be a non-legacy Preamble format. As such, for a certain carrier, by indicating the minimum ECL in such information, the UE 104 can use a determined ECL to select the corresponding Preamble format (and allocated resources), which may be equivalent to the minimum ECL, to initiate the random access procedure, in accordance with some embodiments.

Alternatively, in some embodiments, the minimum ECL and the next greater ECL may corresponds to a same Preamble format (e.g., a non-legacy Preamble format) in which the two ECL's may still correspond to respective different sets of allocated resources.

In some embodiments, after the UE 104 receives the one or more broadcasted messages, the method 500 continues to operation 504 in which the UE 104 determines whether it supports the non-legacy Preamble format. In some embodiments, the UE 104 may make the determination based on a pre-defined protocol, a higher-level message (e.g., a Radio Resource Control (RRC) message), and/or UE Capability (Information). In some embodiments, when the UE 104 does not support the non-legacy Preamble format, the method 500 continues to operation 506 in which the UE 104, different from the method 300, can still access (camp on) the cell but chooses the corresponding resources allocated for the legacy Preamble format to initiate the random access procedure (e.g., using the non-legacy Preamble format to send a Preamble as shown in FIG. 5, etc.). On the other hand, when the UE 104 does support the non-legacy Preamble format, the method 500 continues to operation 508 in which the UE 104, different from the method 400, chooses corresponding resources allocated for the non-legacy Preamble format based on a determined ECL to initiate the random access procedure (e.g., using the non-legacy Preamble format to send a Preamble as shown in FIG. 5, etc.). In some embodiments, the UE 104 may determine its own ECL by measuring a Reference Signals Received Power (RSRP) level of a reference signal sent by the BS 102. Accordingly, the UE 104 can select respective allocated resources based on the determined (measured) ECL and the information about the correspondence of one or more ECL's to the non-legacy Preamble format that is broadcasted in operation 502, in accordance with some embodiments of the present disclosure.

Figure 6:
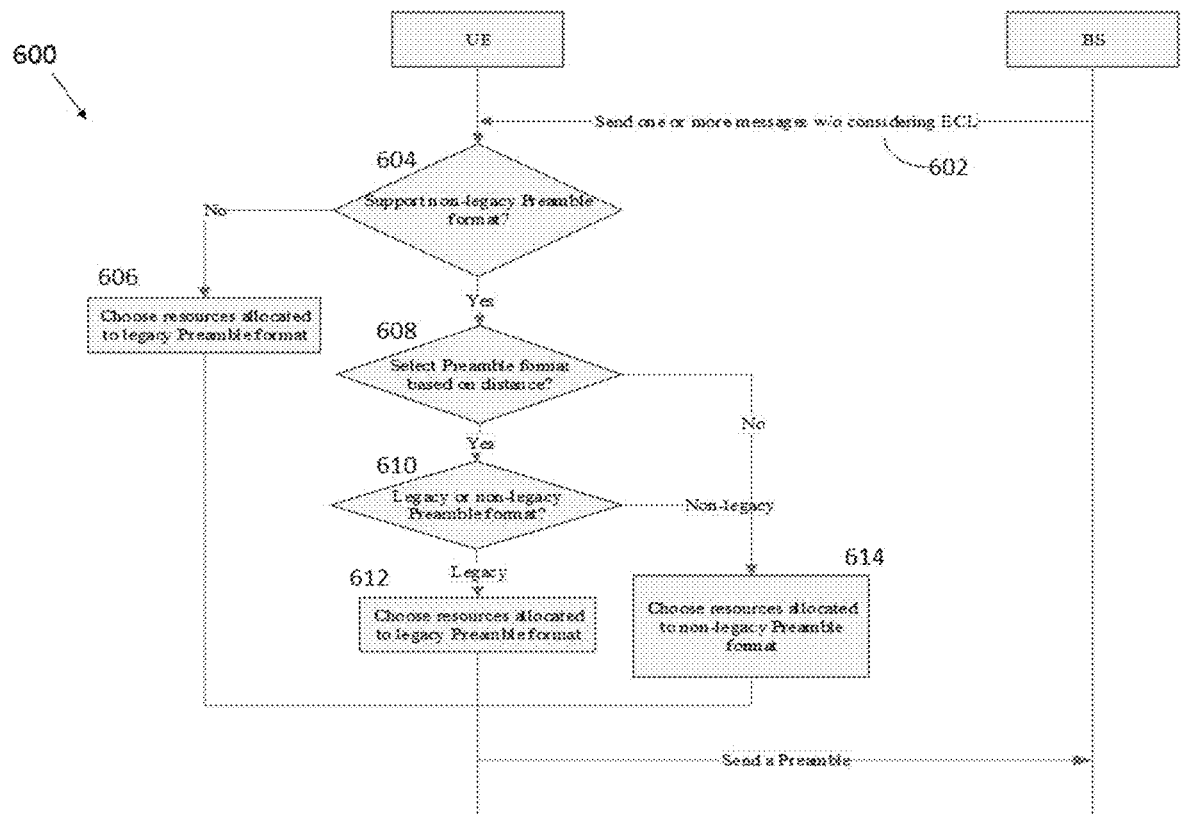
FIG. 6 illustrates a flow chart of yet another exemplary method collectively performed by a base station and user equipment device to initiate a random access procedure, in accordance with some embodiments of the present disclosure.

FIG. 6 illustrates an exemplary method 600 collectively performed by a BS and a UE in the disclosed NB-IoT system to initiate a random access procedure, in accordance with some embodiments of the present disclosure. In various embodiments, the operations of the method 600 are performed by the respective components illustrated in FIGS. 1-2. For purposes of discussion, the following embodiment of the method 600 will be described in conjunction with FIGS. 1-2. The illustrated embodiment of the method 600 is merely an example. Therefore, it should be understood that any of a variety of operations may be omitted, re-sequenced, and/or added while remaining within the scope of the present disclosure.

In some embodiments, the method 600 is substantially similar to the method 300 with respect to FIG. 3 except that when the UE 104 determines that it can support the non-legacy Preamble formats (i.e., operations 404 and 604, respectively), the UE 104 further determines whether to use legacy or non-legacy Preamble format based on a distance between the UE 104 and BS 102. Similar as the method 300, after the UE 104 determines that it can only support the legacy Preamble formats, the UE 104 chooses the corresponding resources allocated for the legacy Preamble format to initiate the random access procedure (i.e., operations 406 and 606, respectively). For purposes of brevity, the discussions of the operations 404/604 and 406/606 are not repeated here. Accordingly, the following discussions with respect to the method 600 of FIG. 6 will start from operation 608.

In some embodiments, in operation 608 (i.e., after the UE 104 determine that it can support the non-legacy Preamble format), the UE 104 determines whether to use a distance between the UE 104 and BS 102 to select a Preamble format. In some embodiments, the UE 104 may make the determination based on a pre-defined protocol, a higher-level message (e.g., a Radio Resource Control (RRC) message), and/or UE Capability (Information). If the decision is to select the Preamble format based on the distance, the method 600 proceeds to operation 610 in which the UE 104 determines whether to use the legacy Preamble format or non-legacy Preamble format based on the distance. In some embodiments, the UE 104 may make the determination in operation 610 based on the above-mentioned distance through various techniques, which will be respectively discussed in further detail below. If the decision in operation 610 is to use the legacy Preamble format, the method 600 proceeds to operation 612 in which the UE 104 chooses the corresponding resources allocated for the legacy Preamble format to initiate the random access procedure. If the decision in operation 610 is to use the legacy Preamble format, the method 600 proceeds to operation 614 in which the UE 104 chooses corresponding resources allocated for the non-legacy Preamble format to initiate the random access procedure. Referring again to operation 608, on the other hand, if the decision is to select the Preamble format "not" based on the distance, the method 600 directly proceeds to operation 614 in which the UE 104 chooses corresponding resources allocated for the non-legacy Preamble format to initiate the random access procedure.

As described above, in operation 610, the UE 104 may determine whether to use the legacy or non-legacy Preamble format based on the distance from itself to the BS 102. In an embodiment, when the UE 104 is stationary (i.e., not moving around), the UE 104 may release its RRC (Radio Resource Control) connection and store the last used TA (Timing Advanced) command. Accordingly, the UE 104 may use such a stored TA to estimate the distance, which corresponds to the last used Preamble format (e.g., either the legacy or non-legacy Preamble format), in accordance with some embodiments. The UE 104 then selects the corresponding Preamble format to use. In another embodiment, similarly, after the UE 104 release its RRC connection, the UE 104 may store the last used Preamble format. And the UE 104 may continue using such a stored Preamble format. In yet another embodiment, the UE 104 may determine whether to use the legacy or non-legacy Preamble format based on the distance that is estimated according to measured RSRP and/or Path Loss value. In particular, one or more thresholds of each of the RSRP and Path Loss values may be included in the broadcasted SIB(s) (i.e., operation 602). Accordingly, the UE 104 may compare the measured RSRP/Path Loss value to the respective thresholds so as to determine which Preamble format to use. For example, when the measured RSRP value is less than the RSRP threshold and/or the Path Loss value is greater than the Path Loss threshold, the UE 104 may determine to use the non-legacy Preamble format, and vice versa.

In some alternative embodiments, the UE 104 may first use the legacy Preamble format to initiate the random access procedure, if failed, the UE 104 may then use the non-legacy Preamble format for the random access procedure.

Figure 7:
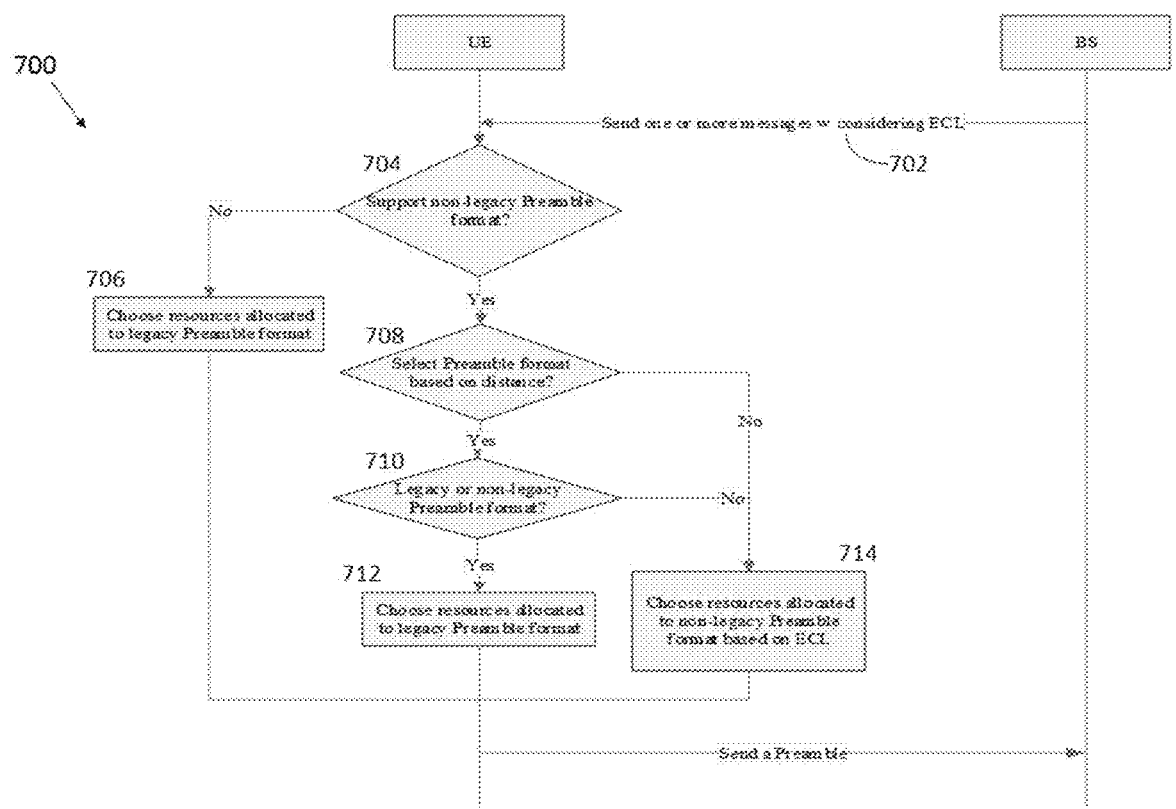
FIG. 7 illustrates a flow chart of yet another exemplary method collectively performed by a base station and user equipment device to initiate a random access procedure, in accordance with some embodiments of the present disclosure.

FIG. 7 illustrates an exemplary method 700 collectively performed by a BS and a UE in the disclosed NB-IoT system to initiate a random access procedure, in accordance with some embodiments of the present disclosure. In various embodiments, the operations of the method 700 are performed by the respective components illustrated in FIGS. 1-2. For purposes of discussion, the following embodiment of the method 700 will be described in conjunction with FIGS. 1-2. The illustrated embodiment of the method 700 is merely an example. Therefore, it should be understood that any of a variety of operations may be omitted, re-sequenced, and/or added while remaining within the scope of the present disclosure.

In some embodiments, the method 700 is substantially similar to the method 500 with respect to FIG. 5 except that when the UE 104 determines that it can support the non-legacy Preamble formats (i.e., operations 504 and 704, respectively), the UE 104 further determines whether to use legacy or non-legacy Preamble format based on a distance between the UE 104 and BS 102. Similar as the method 500, after the UE 104 determines that it can only support the legacy Preamble formats, the UE 104 chooses the corresponding resources allocated for the legacy Preamble format to initiate the random access procedure (i.e., operations 506 and 706, respectively). For purposes of brevity, the discussions of the operations 504/704 and 506/706 are not repeated here. Accordingly, the following discussions with respect to the method 700 of FIG. 7 will start from operation 708.

In some embodiments, in operation 708 (i.e., after the UE 104 determine that it can support the non-legacy Preamble format), the UE 104 determines whether to use a distance between the UE 104 and BS 102 to select a Preamble format. In some embodiments, the UE 104 may make the determination based on a pre-defined protocol, a higher-level message (e.g., a Radio Resource Control (RRC) message), and/or a UE's configuration. If the decision is to select the Preamble format based on the distance, the method 700 proceeds to operation 710 in which the UE 104 determines whether to use the legacy Preamble format or non-legacy Preamble format based on the distance. In some embodiments, the UE 104 may make the determination in operation 710 based on the above-mentioned distance through various techniques, which will be respectively discussed in further detail below. If the decision in operation 710 is to use the legacy Preamble format, the method 700 proceeds to operation 712 in which the UE 104 chooses the corresponding resources allocated for the legacy Preamble format to initiate the random access procedure. If the decision in operation 710 is to use the legacy Preamble format, the method 700 proceeds to operation 714 in which the UE 104 chooses corresponding resources allocated for the non-legacy Preamble format based on a determined ECL to initiate the random access procedure. Referring again to operation 708, on the other hand, if the decision is to select the Preamble format "not" based on the distance, the method 700 directly proceeds to operation 714 in which the UE 104 chooses corresponding resources allocated for the non-legacy Preamble format based on the determined ECL to initiate the random access procedure.

As described above, in operation 710, the UE 104 may determine whether to use the legacy or non-legacy Preamble format based on the distance from itself to the BS 102. In an embodiment, when the UE 104 is stationary (i.e., not moving around), the UE 104 may release its RRC (Radio Resource Control) connection and store the last used TA (Timing Advanced) command. Accordingly, the UE 104 may use such a stored TA to estimate the distance, which corresponds to the last used Preamble format (e.g., either the legacy or non-legacy Preamble format), in accordance with some embodiments. The UE 104 then selects the corresponding Preamble format to use. In another embodiment, similarly, after the UE 104 release its RRC connection, the UE 104 may store the last used Preamble format. And the UE 104 may continue using such a stored Preamble format. In yet another embodiment, the UE 104 may determine whether to use the legacy or non-legacy Preamble format based on the distance that is estimated according to measured RSRP and/or Path Loss value. In particular, one or more thresholds of each of the RSRP and Path Loss values may be included in the broadcasted SIB(s) (i.e., operation 702). Accordingly, the UE 104 may compare the measured RSRP/Path Loss value to the respective thresholds so as to determine which Preamble format to use. For example, when the measured RSRP value is less than the RSRP threshold and/or the Path Loss value is greater than the Path Loss threshold, the UE 104 may determine to use the non-legacy Preamble format, and vice versa.

In some alternative embodiments, the UE 104 may first use the legacy Preamble format to initiate the random access procedure, if failed, the UE 104 may then use the non-legacy Preamble format for the random access procedure.

Figure 8:
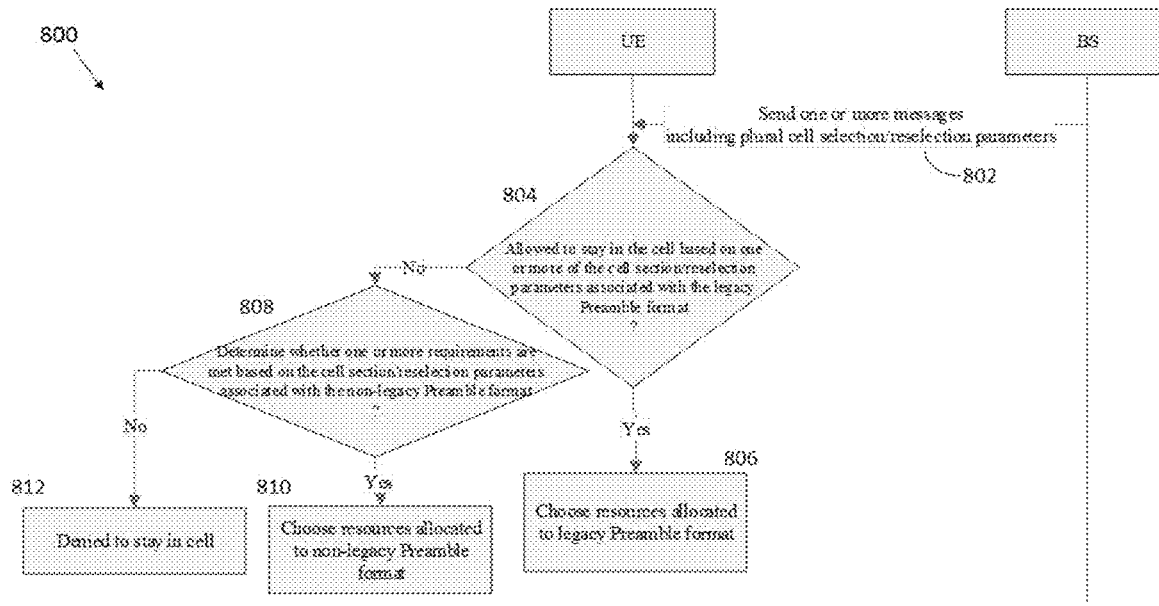
FIG. 8 illustrates a flow chart of yet another exemplary method collectively performed by a base station and user equipment device to initiate a random access procedure, in accordance with some embodiments of the present disclosure.

FIG. 8 illustrates an exemplary method 800 collectively performed by a BS and a UE in the disclosed NB-IoT system to initiate a random access procedure, in accordance with some embodiments of the present disclosure. In various embodiments, the operations of the method 800 are performed by the respective components illustrated in FIGS. 1-2. For purposes of discussion, the following embodiment of the method 800 will be described in conjunction with FIGS. 1-2. The illustrated embodiment of the method 800 is merely an example. Therefore, it should be understood that any of a variety of operations may be omitted, re-sequenced, and/or added while remaining within the scope of the present disclosure.

In some embodiments, the method 800 starts with operation 802 in which the BS 102 sends one or more messages to the UE 104, wherein the one or more messages include information indicating a plurality of cell selection/reselection parameters. According to some embodiments, the BS 102 is configured to broadcast the one or more messages, which include one or more various System Information Blocks (e.g., a System Information Block Type 1 (SIB1), a System Information Block Type 2 (SIB2), a System Information Block Type 3 (SIB3), a System Information Block Type 5 (SIB5), a System Information Block Type 22 (SIB22), etc.), across a cell defined by the BS 102. Specifically, the SIB(s) broadcasted by the BS 102 include respective information of resources allocated to one or more legacy Preamble formats and resources allocated to one or more non-legacy Preamble formats, wherein such information includes how the resources, respectively allocated for the legacy Preamble format and non-legacy Preamble format, are configured and/or how each of the legacy and non-legacy Preamble formats is configured. For example, the SIB(s) broadcasted by the BS 102 may indicate: respective lists of carriers/sub-carriers configured for the legacy and non-legacy Preamble formats, respective sub-carrier spacings (SCS's) configured for the legacy and non-legacy Preamble formats, respective CP lengths configured for the legacy and non-legacy Preamble formats, and respective allocation parameters configured for the legacy and non-legacy Preamble formats (e.g., nprach-Periodicity, nprach-StartTime, nprach-SubcarrierOffset, nprach-NumSubcarriers, nprach-SubcarrierMSG3-RangeStart, npdcch-NumRepetitions-RA, npdcch-StartSF-CSS-RA, npdcch-Offset-RA, nprach-NumCBRA-StartSubcarriers, npdcch-CarrierIndex, etc.).

In some embodiments, the plurality of cell selection/reselection parameters may be broadcasted in the cell through at least one of: SIB1, SIB3, and SIB5. Further, the plurality of cell selection/reselection parameters may be divided into at least two subsets that are associated with the legacy and non-legacy Preamble formats, respectively. For example, the plurality of cell selection/reselection parameters include: a first required minimum received RSRP level in the cell while the legacy Preamble format is used, which is typically referred to as "$Q_{RxLevMin}$;" a second required minimum received RSRP level in the cell while the non-legacy Preamble format is used, which is typically referred to as "$Q_{RxLevMin\_ExtendedCP}$;" a first required minimum quality level in the cell while the legacy Preamble format is used, which is typically referred to as "$Q_{QualMin}$;" a second required minimum quality level in the cell while the non-legacy Preamble format is used, which is typically referred to as "$Q_{QualMin\_ExtendedCP}$;" an offset of a required minimum received RSRP level in the cell that is present while using the non-legacy Preamble format with respect to using the legacy Preamble format; and an offset of a required minimum quality level in the cell that is present while using the non-legacy Preamble format with respect to using the legacy Preamble format.

In some embodiments, the one or more broadcasted messages may further include other information indicating respective maximum repetition numbers for sending a plurality of messages during a random access procedure such as, for example, a maximum number of random access repetitions per attempt for each allocated resource, which is typically referred to as "NumRepetitionsPerPreambleAttempt;" a maximum number of repetitions for searching NPDCCH (Narrowband Physical Downlink Control Channel) common search space (CSS) that is used to send/resend Msg3 and/or Msg4, which is typically referred to as "NPDCCH-NumRepetitions-RA" and a maximum number of repetitions for each allocated ACK/NACK resource that is used to send a HARQ (Hybrid Automatic Repeat Request) response to NPDSCH (Narrowband Physical Downlink Shared Channel), which is typically referred to as "ack-NACK-NumRepetitions." In some embodiments, the above-mentioned maximum repetition numbers may be, collectively or respectively, allocated to the legacy and non-legacy Preamble formats.

In some embodiments, after the UE 104 receives the one or more broadcasted messages, the method 800 continues to operation 804 in which the UE 104 determines whether it is allowed to stay in the cell based on one or more of the cell section/reselection parameters associated with the legacy Preamble format (e.g., $Q_{RxLevMin}$, $Q_{QualMin}$, etc.). More specifically, in some embodiments, the UE 104 may measure an RSRP level of a reference signal sent by the BS 102 and/or a quality level in the cell, and compare the measured levels to the respective minimum requirements (e.g., $Q_{RxLevMin}$, $Q_{QualMin}$, etc.) to determine whether any or each of the requirements is met. If so, the method 800 continues to operation 806 in which the UE 104 selects the corresponding resources allocated for the legacy Preamble format to initiate the random access procedure. On the other hand, if not, the method 800 continues to operation 808 in which the UE 104 further determines whether one or more requirements are met based on the cell section/reselection parameters associated with the non-legacy Preamble format (e.g., $Q_{RxLevMin\_ExtendedCP}$, $Q_{QualMin\_ExtendedCP}$, the offsets as mentioned above, etc.). More specifically, in some embodiments, the UE 104 may compare the measured RSRP and/or quality level to the respective minimum requirements (e.g., $Q_{RxLevMin\_ExtendedCP}$, $Q_{QualMin\_ExtendedCP}$, etc.) to determine whether any or each of the requirements is met. If so, the method 800 continues to operation 810 in which the UE 104 selects the corresponding resources allocated for the non-legacy Preamble format to initiate the random access procedure. On the other hand, if not, the method 800 continues to operation 812 in which the UE 104 is not allowed to stay in the cell.

Referring again to operation 802, in some embodiments, the SIB(s) (e.g., a System Information Block Type 2 (SIB2), a System Information Block Type 2 (SIB22)) broadcasted by the BS 102 may further indicate information about the correspondence of one or more ECL's to the legacy Preamble format and/or non-legacy Preamble format, as discussed above with respect to operation 502 of the method 500 in FIG. 5. As such, in operation 810 of the method 800 in FIG. 8, the UE 104 may chooses corresponding resources allocated for the non-legacy Preamble format based on a determined ECL to initiate the random access procedure, which is substantially similar to operation 508 of the method 500 in FIG. 5. Thus, the corresponding discussions are not repeated here.

In some alternative embodiments, the UE 104 may determine whether it is allowed to stay in the cell based on the principle described as follows. For a legacy UE (i.e., the UE does not support the non-legacy Preamble format) or a UE that has not received the cell section/reselection parameters associated with the non-legacy Preamble format, only the cell section/reselection parameters associated with the legacy Preamble format are used by such a kind of UE for determining whether it is allowed to stay in the cell. And for a non-legacy UE (i.e., the UE supports the non-legacy Preamble format) or a UE that has received the cell section/reselection parameters associated with the non-legacy Preamble format, at least one of the following procedures may be performed by such a kind of UE to determine whether it is allowed to stay in the cell: (1) only using the cell section/reselection parameters associated with the non-legacy Preamble format to make such a decision; (2) first using the cell section/reselection parameters associated with the legacy Preamble format to make the decision; and if failed (e.g., does not meet the requirements defined by the cell section/reselection parameters associated with the legacy Preamble format), then using the cell section/reselection parameters associated with the non-legacy Preamble format to make the decision.

As mentioned above, the SIB(s) broadcasted by the BS 102 may indicate respective lists of carriers/sub-carriers configured for the legacy and non-legacy Preamble formats. In some embodiments, the carriers/sub-carriers configured for the legacy and non-legacy Preamble formats may be collectively indexed. For example, the carriers configured for the legacy Preamble format may be indexed as: 0, 1, 2, 3, 4, 5; and the carriers configured for the non-legacy Preamble format may be indexed as: 6, 7, 8, 9, 10. In some other embodiments, the carriers/sub-carriers configured for the legacy and non-legacy Preamble formats may be respectively indexed. For example, the carriers configured for the legacy Preamble format may be indexed as: 0, 1, 2, 3, 4, 5; and the carriers configured for the non-legacy Preamble format may be indexed as: 0, 1, 2, 3, 4.

Also as mentioned above, the SIB(s) broadcasted by the BS 102 may indicate the respective correspondences of one or more ECL's to the legacy and non-legacy Preamble formats. In some embodiments, when the respective correspondences of ECL's to the legacy and non-legacy Preamble formats are overlapped, the UE may select either the legacy or non-legacy Preamble format to use based on a pre-defined protocol.

Figure 9:
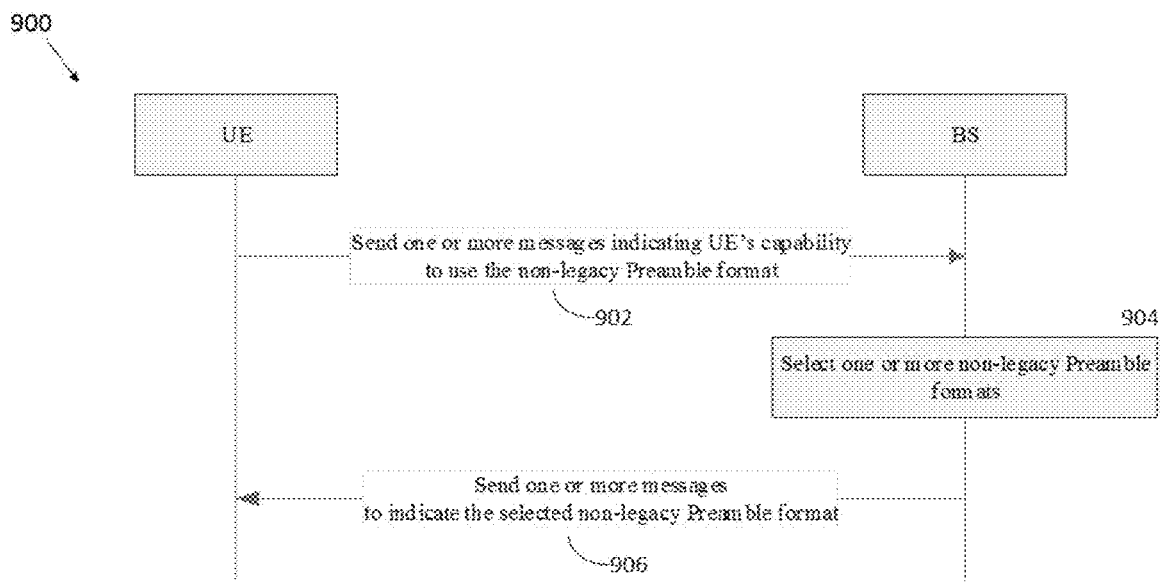
FIG. 9 illustrates a flow chart of yet another exemplary method collectively performed by a base station and user equipment device to initiate a random access procedure, in accordance with some embodiments of the present disclosure.

FIG. 9 illustrates an exemplary method 900 collectively performed by a BS and a UE in the disclosed NB-IoT system to initiate a random access procedure, in accordance with some embodiments of the present disclosure. In various embodiments, the operations of the method 900 are performed by the respective components illustrated in FIGS. 1-2. For purposes of discussion, the following embodiment of the method 900 will be described in conjunction with FIGS. 1-2. The illustrated embodiment of the method 900 is merely an example. Therefore, it should be understood that any of a variety of operations may be omitted, re-sequenced, and/or added while remaining within the scope of the present disclosure.

In some embodiments, the method 900 starts with operation 902 in which the UE 104 sends one or more messages to the BS 102 indicating UE 104's capability to use the non-legacy Preamble format. In some embodiments, such one or more messages include at least one of: Msg1, Msg3, Msg5, and UE Capability Information message. More specifically, in the example of Msg1, the BS 102 may previously allocate a set of resources for the non-legacy Preamble format, and if the UE 104 uses such a set of resources to initiate a random access procedure (i.e., sending the Msg1), the BS 102 may determine that the UE 104 cab use the non-legacy Preamble format. In the example of Msg3, the UE 104 may send its capability to use the non-legacy Preamble format (e.g., whether it supports non-legacy Preamble format) through sending at least one of: RRCConnectionRequest-NB, RRCConnectionResumeRequest-NB, and RRCEarlyDataRequest-NB, and respective MAC CE's (Medium Access Control Elements). In the example of Msg5, the UE 104 may send its capability to use the non-legacy Preamble format (e.g., whether it supports non-legacy Preamble format) through sending at least one of: RRCConnectionResumeComplete-NB and RRCConnectionSetupComplete-NB.

In some embodiments, in response to acknowledging that the UE 104 supports the non-legacy Preamble format, the method 900 continues to operation 904 in which the BS 102 selects one or more non-legacy Preamble formats. In some embodiments, the BS 102 selects the one or more non-legacy Preamble formats based on at least one of the following parameters/techniques: the TA command last used by the UE 104; comparing a measured RSRP level with a pre-defined RSRP threshold; and the Preamble format last used by the UE 104.

The method 900 continues to operation 906 in which the BS 102 sends one or more messages to indicate the selected non-legacy Preamble format. In some embodiments, the BS 102 may indicate such a selected non-legacy Preamble format by sending one or more Physical Downlink Control Channel (PDCCH) signal (e.g., following a PDCCH Order) or including information about the selected non-legacy Preamble format in a Downlink Control Information (DCI) signal. In some other embodiments, the BS 102 may indicate such a selected non-legacy Preamble format through one or more RRC messages selected from the group consisting of: RRCConnectionSetup-NB, RRCConnectionResume-NB, RRCConnectionReconfiguration-NB, and RRCConnectionReestablishment-NB.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, comprising:
   receiving, from a wireless communication device, an acknowledgment that the wireless communication device supports a format of a plurality of formats for a random access preamble;
   selecting, in response to the acknowledgment that the wireless communication device supports the format of the plurality of formats for the random access preamble, the format of the plurality of formats for the random access preamble; and
   sending a message to indicate the selected format for the random access preamble to the wireless communication device.

2. The method of claim 1, wherein the message comprises a physical downlink control channel (PDCCH) signal, a downlink control information (DCI) signal, or a radio resource control (RRC) message.

3. The method of claim 2, wherein the RRC message comprises at least one of: a RRCConnectionSetup-NB message, a RRCConnectionResume-NB message, a RRCConnectionReconfiguration-NB message, or RRCConnectionReestablishment-NB message.

4. The method of claim 1, wherein selecting the format of the plurality of formats for the random access preamble is based on at least one of: a timing advance (TA) command used by the wireless communication device; a comparison between a measured reference signals received power (RSRP) with a defined RSRP threshold; or the format of the random access preamble used by the wireless communication device.

5. A wireless communication node, comprising:
   at least one processor coupled with memory, configured to:
      receive, from a wireless communication device, an acknowledgment that the wireless communication device supports a format of a plurality of formats for a random access preamble;
      select, in response to the acknowledgment that the wireless communication device supports the format of the plurality of formats for the random access preamble, the format of the plurality of formats for the random access preamble; and
      send a message to indicate the selected format for the random access preamble to the wireless communication device.

6. The wireless communication node of claim 5, wherein the message comprises a physical downlink control channel (PDCCH) signal, a downlink control information (DCI) signal, or a radio resource control (RRC) message.

7. The wireless communication node of claim 6, wherein the RRC message comprises at least one of: a RRCConnectionSetup-NB message, a RRCConnectionResume-NB message, a RRCConnectionReconfiguration-NB message, or RRCConnectionReestablishment-NB message.

8. The wireless communication node of claim 5, wherein the at least one processor is configured to select the format of the plurality of formats for the random access preamble based on at least one of: a timing advance (TA) command used by the wireless communication device; a comparison between a measured reference signals received power (RSRP) with a defined RSRP threshold; or the format of the random access preamble used by the wireless communication device.

9. A method performed by a wireless communication device, comprising:
   sending, to a wireless communication node, an acknowledgement that the wireless communication device supports a format of a plurality of formats for a random access preamble, the format of the plurality of formats for the random access preamble; and
   receiving, from the wireless communication node, a message to indicate a selected format for the random access preamble.

10. The method of claim 9, wherein the message comprises a physical downlink control channel (PDCCH) signal, a downlink control information (DCI) signal, or a radio resource control (RRC) message.

11. The method of claim 10, wherein the RRC message comprises at least one of: a RRCConnectionSetup-NB message, a RRCConnectionResume-NB message, a RRCConnectionReconfiguration-NB message, or RRCConnectionReestablishment-NB message.

12. The method of claim 9, wherein the format of the plurality of formats for the random access preamble is selected based on at least one of: a timing advance (TA) command used by the wireless communication device; a comparison between a measured reference signals received power (RSRP) with a defined RSRP threshold; or the format of the random access preamble used by the wireless communication device.

13. A wireless communication device, comprising:
at least one processor coupled with memory, configured to:
send, to a wireless communication node, an acknowledgement that the wireless communication device supports a format of a plurality of formats for a random access preamble, the format of the plurality of formats for the random access preamble; and
receive, from the wireless communication node, a message to indicate a selected format for the random access preamble.

14. The wireless communication device of claim 13, wherein the message comprises a physical downlink control channel (PDCCH) signal, a downlink control information (DCI) signal, or a radio resource control (RRC) message.

15. The wireless communication device of claim 14, wherein the RRC message comprises at least one of: a RRCConnectionSetup-NB message, a RRCConnectionResume-NB message, a RRCConnectionReconfiguration-NB message, or RRCConnectionReestablishment-NB message.

16. The wireless communication device of claim 13, wherein the format of the plurality of formats for the random access preamble is selected based on at least one of: a timing advance (TA) command used by the wireless communication device; a comparison between a measured reference signals received power (RSRP) with a defined RSRP threshold; or the format of the random access preamble used by the wireless communication device.

* * * * *